Patented Oct. 19, 1943

2,332,145

UNITED STATES PATENT OFFICE 2,332,145

MANUFACTURE OF COPPER SULPHIDE

John O. Hay, Cleveland Heights, Ohio, assignor to The Harshaw Chemical Company, Elyria, Ohio, a corporation of Ohio No Drawing. Application May 23, 1942, Serial No. 444,269

6 Claims. (Cl. 23—135)

This invention relates to the production of cupric sulphide as a dense powder from metallic copper and elemental sulphur.

I have now discovered a novel process whereby metallic copper, suitably scrap copper, can be caused to unite with elemental sulphur. This process essentially consists of contacting powdered, finely ground, sulphur, such as sulphur flour or flowers of sulphur and metallic copper in an acid, aqueous solution of a metallic salt which is maintained at an elevated temperature, preferably at or near its boiling point. The copper and sulphur react to form copper sulphide, the surface of the copper remaining essentially clean and reactive. At the conclusion of the reaction, granular cupric sulphide is the sole solid product in the reaction vessel and the solution is not depleted of its salt content and can be used over again. However, disregarding the case where a copper salt might initially be present, the solution will now contain a trace of copper presumably associated with a portion of the anion of the free acid. This amount of free copper is sufficient to respond to the well known ammonia test, but provided excessive amounts of free acid, particularly hydrochloric, were not present, is so small that it offers no practical interference to combining of equivalent weights of copper and sulphur.

The metallic salt may be any one or a mixture of soluble sulphates and chlorides provided they do not react among themselves or with copper to produce an insoluble precipitate. The free acid may be either sulphuric or hydrochloric or a mixture of both. Suitable metallic salts are the chlorides and sulphates of alkali and alkaline earth metals, Mg, Cu and Fe, except that the sulphates of Ba and Ca are too insoluble for practical purposes. The pH should be below 7.0, preferably about 3.0 to 4.0 although the reaction will proceed at even higher acidity. Suitable combinations because of ready availability, low cost, and rapid speed of reaction, are, among others, sodium chloride and hydrochloric acid, sodium chloride and sulphuric acid, copper sulphate and sulphuric or hydrochloric acid, cupric chloride and hydrochloric acid, cuprous chloride dissolved in sodium chloride solution and hydrochloric acid, etc. Seemingly, the salt solution acts to (1) catalyze the reaction between copper and sulphur, (2) cause the desired physical characteristics of the CuS, (3) permit boiling temperatures in excess of 100° C.

In the preferred operation of my process, equivalent quantities of metallic copper and finely divided sulphur are weighed. The sulphur is thoroughly wet by triturating in a small portion of water and acid or acid and mother liquor from the preceding batch or if no additional acid is desirable a wetting agent and mother liquor may be used. As a uniformly smooth cream the wetted sulphur is added to the relatively concentrated salt solution in the reaction vessel. The solution may be from about 10% saturated to fully saturated. The metallic copper is then added and the reaction mixture heated. The temperature must be elevated above room temperature and preferably is from about 90° C. to 107° C. After a period of time, depending largely on the ratio of surface to weight of the scrap, the metallic copper will have disappeared. A short additional heating time is given after the copper has disappeared to ensure that there is no very fine scrap left mixed in with the precipitate of cupric sulphide. The precipitate is filtered off and washed, this being, because of the granular nature of the product, a very rapid and simple operation. The cupric sulphide may either be dried at a moderate temperature to a dense blue-black product or it may be preserved wet for further processing. The salt solution may be used again for the next batch.

Example I 200 g. of copper wire (heavy gauge) was placed in a flask with reflux condenser. 500 cc. of water, 200 g. of NaCl and 10 cc. of HCl were added. This solution was boiled while to it was added 100 g. of S in small portions slurried in a little 2% Tergitol solution. Within 3 hours all of the copper was converted to cupric sulphide. Because of the presence of a small amount of HCl, there was a small amount of $Cu_2Cl_2$ in the final solution. The product was a blue black powder very rapidly filtered and washed. It weighed 297.7 g.

Example II 400 g. of copper wire was placed in the flask with a solution of 200 g. $CuSO_4.5H_2O$, 1000 cc. of $H_2O$, 5 cc. conc. $H_2SO_4$. 201 g. of sulphur flour, which was thoroughly wet with 2% Tergitol solution and rubbed free of lumps, was added and thoroughly stirred in. Heating was then started and the solution boiled. At the end of 3 hours, none of the wire was left. The product showed no signs of free S. A weight on the product was not obtained as it was preserved wet for further experiments. It was very black and granular. The solution contained the original 200 g. of $CuSO_4.5H_2O$.

What I claim is:

1. A process for producing copper sulphide from metallic copper and elemental sulphur comprising contacting at an elevated temperature metallic copper and finely divided sulphur in an acid aqueous solution of a salt of the class consisting of the sulphates and chlorides of the alkali and alkaline earth metals, magnesium, copper and iron.

2. A process according to claim 1 wherein the reaction is carried out at a temperature from 90° C. to the boiling temperature of the solution.

3. A process for producing copper sulphide from metallic copper and elemental sulphur comprising contacting at an elevated temperature metallic copper with finely divided sulphur in an acid solution containing sodium chloride and hydrochloric acid.

4. A process for producing copper sulphide from metallic copper and elemental sulphur comprising contacting at an elevated temperature metallic copper with finely divided sulphur in an acid solution containing copper sulphate and sulphuric acid.

5. A process according to claim 3 wherein the reaction mixture is maintained at a temperature between 90° C and the boiling point until the reaction is substantially complete.

6. A process accroding to claim 4 wherein the reaction mixture is maintained at a temperature between 90° C. and the boiling point until the reaction is substantially complete.

JOHN O. HAY.